United States Patent [19]
Robison et al.

[11] 3,759,933
[45] Sept. 18, 1973

[54] 3H-IMIDAZO(4,5-C)PYRIDINES

[75] Inventors: Michael Mullen Robison, Bottmingen, Switzerland; Neville Finch, West Orange, N.J.

[73] Assignee: Ciba-Geigy Corporation, Ardsley, N.Y.

[22] Filed: Mar. 6, 1972

[21] Appl. No.: 232,259

[52] U.S. Cl. 260/295 K, 260/294.8 C, 260/294.8 R, 260/295 S, 260/295.5 S, 424/266
[51] Int. Cl. .......................................... C07d 31/40
[58] Field of Search .................. 260/296 H, 295 K, 260/295 S, 295.5 S

[56] References Cited
UNITED STATES PATENTS
3,459,759  8/1969  Rochling et al. .............. 260/296 H Primary Examiner—Alan L. Rotman
Attorney—Joseph G. Kolodny et al.

[57] ABSTRACT

3H-1,2-dihydro-imidazo[4,5-c]pyridines, e.g., those of the formula

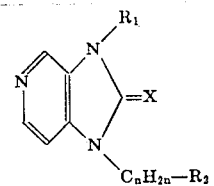

$R_1$ = H or aliphatic radical
X = O or S, n = 0 to 4
$R_2$ = aromatic radical acyl derivatives, N-oxides, quaternaries or salts thereof exhibit anti-inflammatory effects.

3 Claims, No Drawings

3H-IMIDAZO(4,5-C)PYRIDINES

SUMMARY OF THE INVENTION

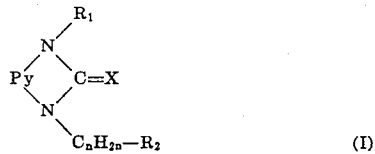

in which Py is a 3,4-pyridylene radical, $R_1$ is hydrogen or an aliphatic or cycloaliphatic radical, X is oxygen or sulfur, n is one of the integers from 0 to 4 and $R_2$ is an aromatic radical, of acyl derivatives, N-oxides, quaternaries and salts thereof, as well as of corresponding pharmaceutical compositions and of methods for the preparation and application of these products. Said products of the invention exhibit anti-inflammatory effects in mammals and are useful for this purpose.

DESCRIPTION OF THE PREFERRED EMBODIMENT

The 3,4-pyridylene radical Py (having its nitrogen atom para to the 1-position of the imidazole ring) is preferably unsubstituted, but can also be substituted in the remaining 3-positions by one -butyl, more than one, preferably one substituent selected, for example, from lower alkyl, e.g., methyl, ethyl, n- or i-propyl or -buty, or free, etherified or esterified hydroxy, such as lower alkoxy, e.g., methoxy, ethoxy, n- or i-propoxy or -butoxy, or halogeno, e.g., fluoro, chloro or bromo. Most preferred radicals Py are 3,4-pyridylene or (lower alkyl)-3,4-pyridylene, e.g., 2-, 5- or 6-methyl-3,4-pyridylene. The term "lower," referred to above and hereinafter in connection with organic radicals or compounds respectively, defines such with up to 7, preferably up to 4, carbon atoms.

An aliphatic radical $R_1$ is preferably lower alkyl or alkenyl, e.g., that mentioned above, allyl or methallyl respectively, or a 3 to 7 ring-membered cycloalkyl or cycloalkenyl radical, e.g., cyclopropyl, cyclopentyl, cyclohexyl or cycloheptyl; 1-cyclopentenyl, 1-cyclohexenyl or 1-cycloheptenyl.

In case n stands for an integer from 1 to 4, the lower alkylene radical $C_nH_{2n}$ represents, for example, methylene, 1,1- or 1,2-ethylene, 1,1-, 1,2- or 1,3-propylene, 1,1-, 1,2-, 1,3-, 1,4- or 2,3-butylene. Preferably n stands for the integer 0, thus reducing $C_nH_{2n}$ to a direct bond.

The aromatic radical $R_2$ stands preferably for an unsubstituted or substituted phenyl radical containing one or more than one, preferably up to three of the same or different substituents, such as the lower alkyl, free, etherified or esterified hydroxy groups mentioned above, as well as trifluoromethyl, amino, mono- or di-lower alkylamino groups, e.g., methyl- or ethylamino, dimethyl- or diethylamino. Preferred aromatic radicals $R_2$ are represented by phenyl, (lower alkyl)$_m$-phenyl, (hydroxy)$_m$-phenyl, (lower alkoxy)$_m$-phenyl, (halogeno)$_m$-phenyl, (trifluoromethyl)-phenyl or (amino)-phenyl and m is an integer from 1 to 3, preferably 1.

Acyl derivatives of primary or secondary amines of Formula I are preferably those of aliphatic or araliphatic carboxylic acids, such as of lower alkanoic, $R_2$-lower alkanoic or N-$R_2$-carbamic acids, e.g., of acetic, propionic, pivalic, benzoic, phenylacetic or N-phenylcarbamic acid.

Quaternaries and salts of the compounds of Formula I are preferably lower alkyl or $R_2$-lower alkyl quaternaries and acid addition salts.

The compounds of the invention exhibit valuable pharmacological properties, for example, anti-inflammatory effects. This can be demonstrated in animal tests, using advantageously mammals, such as mice or rats, as test objects. The compounds of the invention can be applied to the animals enterally, parentally or topically, for example, orally in the form of aqueous solutions or suspensions by stomach tube. The dosage may range between about 1 and 200 mg/kg/day, preferably between about 3 and 80 mg/kg/day. Besides some central nervous system depressant activity at high doses, as recorded in the mice jiggle cage test system, where the spontaneous movements of the animals are registered, the compounds of the invention exhibit predominantly anti-inflammatory effects as determined, for example, in the rat paw edema test system [Winter et al, Proc. Soc. Exp. Biol. and Med. 111, 544 (1962)].

Thus, for example, oral administration of about 25 mg/kg/day of the 1-(4-chlorophenyl)-2-oxo-3H-1,2-dihydro-imidazo[4,5-c]-pyridine, a characteristic compound of the invention, to rats causes a marked inhibition of the paw edema induced by carrageenin. Moreover, said compound does not produce ulcers in the rat's gastrointestinal tract within 24 hours at about 80 mg/kg/day. Accordingly, the compounds of the invention are useful anti-inflammatory agents in the treatment or management of arthritic or dermatopathologic conditions. They are also valuable intermediates in the preparation of other useful products, especially of pharmacologically active compounds.

Particularly useful are compounds of Formula I, in which Py is 3,4-pyridylene or (lower alkyl)-3,4-pyridylene, $R_1$ is hydrogen, lower alkyl or 5 to 7 ring-membered cycloalkyl or cycloalkenyl, X is oxygen or sulfur, n is an integer from 0 to 4 and $R_2$ is phenyl, (lower alkyl)$_m$-phenyl, (hydroxy)$_m$-phenyl, (lower alkoxy)$_m$-phenyl, (halogeno)$_m$-phenyl, (trifluoromethyl)-phenyl or (amino)- phenyl wherein m is an integer from 1 to 3, the lower alkanoyl, $R_2$-lower alkanoyl or N-$R_2$-carbamoyl derivatives of the compounds in which $R_1$ is hydrogen, the N-oxide, lower alkyl or $R_2$-lower alkyl quaternaries of the compounds in which $R_2$ is lower alkyl, cycloalkyl or cycloalkenyl or therapeutically acceptable acid addition salts thereof.

Preferred compounds of the invention are those of Formula II

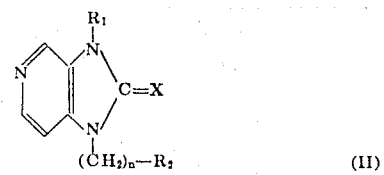

in which $R_1$ is hydrogen, alkyl or alkanoyl, X is oxygen or sulfur, n is an integer from 0 to 2 and $R_2$ is phenyl, (alkyl)-phenyl, (hydroxy)-phenyl, (alkoxy)-phenyl, (halogeno)-phenyl or (trifluoromethyl)-phenyl, wherein alkyl contains up to 4 carbon atoms or therapeutically acceptable acid addition salts thereof.

Especially valuable compounds are those of Formula II, wherein $R_1$ is hydrogen, methyl, acetyl or pivaloyl, X is oxygen, n is the integer 0 and $R_2$ is phenyl, 4-fluorophenyl or 4-chlorophenyl, or therapeutically acceptable acid addition salts thereof.

The compounds of this invention are prepared according to methods known per se. For example, they are obtained by ring-closing a compound of Formula III

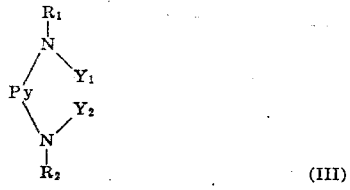

(III)

wherein one of $Y_1$ and $Y_2$ is hydrogen and the other is a reactive, functionally converted carboxy group and, if desired, converting any resulting compound into another compound of the invention.

In the compounds of Formula III, the reactively converted carboxy group $Y_1$ or $Y_2$ is advantageously a carbamoyl or thiocarbamoyl group whose nitrogen atom is preferably substituted, e.g., by lower alkyl, or is a ring-member of a heterocyclic moiety, e.g., of the imidazole ring. $Y_1$ or $Y_2$ may also be an esterified carboxy or thiocarboxy group, e.g., a lower carbalkoxy group. The ring-closure is brought about at room temperature or at elevated temperatures, for example such between about 50° and 300°, advantageously between about 100° and about 200°.

The compounds of the invention so obtained can be converted into each other according to methods known per se. For example, resulting compounds of Formula I, in which $R_1$ is hydrogen, are reacted with reactive esters of the corresponding alcohols $R_1$-OH. Advantageously, esters of the aliphatic or cycloaliphatic alcohols and strong inorganic acids are used, particularly those of hydrohalic acids, e.g., hydrochloric or hydrobromic acid, of sulfuric or sulfonic acids, such as lower alkane or benzene sulfonic acids, e.g., methane, ethane, benzene or p-toluene sulfonic acid, in order to obtain the corresponding aliphatically or cycloaliphatically substituted compounds. Said compounds with $R_1$=H can also be acylated, for example, with the use of the corresponding acid halides or anhydrides, e.g., simple or mixed anhydrides or isocyanates. Acyl derivatives obtained may also be hydrolyzed, e.g., with acids or alkalies, or reduced with simple or complex light metal hydrides. Resulting compounds in which X is oxygen, can be converted into the corresponding sulfur compounds, for example, by reacting them with sulfurization agents, such as phosphorus pentasulfide, or resulting sulfur compounds treated with desulfurization agents, such as lead or mercury oxide. Resulting compounds containing but tertiary nitrogen can be converted into N-oxides or quaternaries, e.g., by reaction with oxidizing agents, such as hydrogen peroxide or peracids, e.g., aliphatic or aromatic percarboxylic acids, or reactive esters of lower alkanols or $R_2$-alkanols respectively.

A resulting base can also be converted into a corresponding acid addition salt, for example by reacting it with an inorganic or organic acid, such as a therapeutically useful acid, or with a corresponding anion exchange preparation, and isolating the desired salt. An acid addition salt may be converted into the corresponding free compound by treatment with a base, e.g., a metal hydroxide, ammonia or a hydroxyl ion exchange preparation. Therapeutically useful acids are, for example, inorganic acids, e.g., hydrochloric, hydrobromic, sulfuric, phosphoric, nitric or perchloric acid, or organic acids, e.g., carboxylic or sulfonic acids, such as formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxy-benzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic, sulfanilic and cyclohexylsulfamic acid; methionine, tryptophan, lysine and arginine.

These or other salts, for example, the picrates, can also be used for purification of the resulting free compounds, which are converted into salts, the salts separated and the free compounds liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g., by fractional distillation, crystallization and/or chromatography. Racemic products can likewise be resolved into the optical antipodes, for example by separation of diastereomeric salts thereof, e.g., by the fractional crystallization of d- or l-tartrates.

The above reactions are carried out according to standard methods, in the presence or absence of diluents, preferably such as are inert to the reagents and are solvents thereof, of catalysts, condensing, neutralizing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. The compounds of Formula III, in which one of $Y_1$ or $Y_2$ is a carbamoyl group, especially such whose nitrogen atom is part of a heterocyclic ring, e.g., the imidazole ring, are merely intermediates in the reaction of compounds of Formula III, wherein both $Y_1$ and $Y_2$ are hydrogen, with reactive carbonic or thiocarbonic acid derivatives, e.g., 1,1'-carbonyldiimidazole. Those starting materials are preferably to be used, which lead to those compounds of the invention, which are indicated above as the preferred embodiments of the invention.

The starting material used is known or, if new, can be prepared analogous to the methods used for the known compounds. For example, the compounds of Formula III, wherein both $Y_1$ and $Y_2$ are hydrogen, are prepared analogous to the reactions described in Ber. 72, 936 (1939) or Ann. 529, 294 (1937). The corresponding pyridine-diamines, described therein, are then converted into compounds of Formula III, wherein only one of $Y_1$ and $Y_2$ is hydrogen, by reaction with a reactive carbonic or thiocarbonic acid derivative, advantageously 1,1'-carbonyldiimidazole, or a reactive formic acid derivative, advantageously a haloformate, e.g., a lower alkylchloroformate.

The pharmacologically active compounds of the invention are useful in the manufacture of pharmaceutical compositions comprising an effective amount thereof in conjunction or admixture with excipients suitable for either enteral, parenteral or topical application. Preferred are tablets and gelatin capsules comprising the active ingredient together with (a) diluents, e.g., lactose, dextrose, sucrose, mannitol, sorbitol, cellulose and/or glycine, (b) lubricants, e.g., silica, talcum, stearic acid, its magnesium or calcium salt and/or polyethyleneglycol, for tablets also (c) binders, e.g., magnesium aluminum silicate, starch paste, gelatin, tragacanth, methylcellulose, sodium carboxymethylcellulose and/or polyvinylpyrrolidone, if desired, (d) disintegrants, e.g., starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories or ointments are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75 percent, preferably about 1 to 50 percent, of the active ingredient.

The following examples are intended to illustrate the invention and are not to be construed as being limitations thereon. Temperatures are given in degrees Centigrade, and all partd wherever given are parts by weight.

Example 1

The mixture of 9.25 g of 3-amino-4-phenylaminopyridine, 9.8 g of 1,1'-carbonyldiimidazole and 300 ml of dry methylene chloride is stirred at room temperature for 18 hours and evaporated under reduced pressure. The residue is washed with water and recrystallized from acetonitrile-ethanol (4:1), to yield the 1-phenyl-2-oxo-3H-1,2-dihydro-imidazo[4,5-c]pyridine of the formula

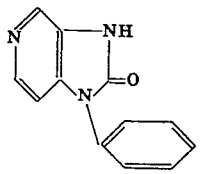

melting at 246.5°.

The starting material is prepared as follows: To the solution of 105 g of 4-hydroxypyridine in 75 ml of water, 69 ml of 69 percent aqueous nitric acid are added while stirring and the mixture is allowed to stand at room temperature for 18 hours. The precipitate formed is filtered off, to yield the 4-hydroxypyridinium nitrate, melting at 206°-208° with decomposition.

10 g thereof are added to the mixture of 20 g of fuming sulfuric acid (20 percent sulfur trioxide) and 20 g of 90 percent aqueous nitric acid and the mixture is stirred and gently heated on the steam bath for 1 hour. It is poured onto 50 g of ice, the suspension cooled to 0°, the precipitate formed filtered off and washed with water, to yield the 3-nitro-4-hydroxypyridine.

The mixture of 18.5 g thereof, 5.8 g of phosphorus oxychloride and 20 g of phosphorus pentachloride is stirred at room temperature for 1 hour and slowly heated to 140°, to yield a clear solution containing 3-nitro-4-chloropyridine. It is cooled and 50 ml of anhydrous methanol are added slowly while stirring at 0°. The precipitate formed is filtered off, washed with diethyl ether and dissolved in water. The solution is made basic with potassium carbonate at 0°, extracted with methylene chloride, the extract dried and evaporated, to yield the 3-nitro-4-methoxypyridine melting at 70°-75°.

The mixture of 16.6 g thereof and 10.5 g of aniline is stirred at 130° for 2 hours under nitrogen, cooled and recrystallized from acetonitrile, to yield the 3-nitro-4-phenylamino-pyridine, melting at 116°-118°.

The mixture of 10 g thereof, 1 g of 10 percent palladium on charcoal and 200 ml of 95 percent aqueous ethanol is hydrogenated at room temperature and 3 at until the hydrogen uptake ceases. It is filtered and the filtrate evaporated under reduced pressure at a temperature not exceeding 40°. The residue is recrystallized from ethanol, to yield the 3-amino-4-phenylaminopyridine, melting at 168°-171°.

Example 2

To the mixture of 5 g of 1-phenyl-2-oxo-3H-1,2-dihydro-imidazo[4,5-c]pyridine and 125 ml of dimethylformamide, 1.23 g of 50 percent sodium hydride in mineral oil are added portionwise while stirring under nitrogen for 1½ hour. Hereupon the solution of 1.3 g of methyl chloride in 25 ml of dimethylformamide is added and the mixture stirred at 45°-50° for 18 hours. It is evaporated under reduced pressure at about 50°, the residue taken up in the minimum amount of N hydrochloric acid, the solution washed with petroleum ether and made basic with potassium carbonate. It is extracted with methylene chloride, the extract dried and evaporated, to yield the 1-phenyl-2-oxo-3-methyl-1,2-dihydro-imidazo[4,5-c]-pyridine of the formula

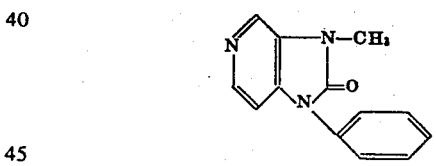

melting at 160°.

In substantially the same manner, there is obtained the 1-(4-fluoro)-phenyl-2-oxo-3-(2-propyl)-1,2-dihydroimidazo[4,5-c]-pyridine hydrochloride, melting at 255°-260° C with decomposition, from the corresponding 1-(4-fluoro)-phenyl-2-oxo-3H-1,2-dihydro-imidazo[4,5-c]-pyridine and 2-propyl bromide. Also there is obtained the 1-(3,4,5-trimethoxy)-phenyl-2-oxo-3-allyl-1,2-dihydro-imidazo[4,5-c]-pyridine cyclohexylsulfamate, melting at 183°-184° C, from the corresponding 1-(3,4,5-trimethoxy)-phenyl-2-oxo-3H-1,2-dihydro-imidazo[4,5-c]-pyridine and allyl bromide.

Example 3

The mixture of 1 g of 1-phenyl-2-oxo-3H-1,2-dihydroimidazo[4,5-c]pyridine, 10 ml of acetic anhydride and 0.5 g of sodium acetate is stirred on the steam bath for 2½ hours and evaporated under reduced pressure. The residue is triturated with ice water, filtered off and dried, to yield the 1-phenyl-2-oxo-3-acetyl-1,2-dihydro-imidazo[4,5-c]pyridine of the formula

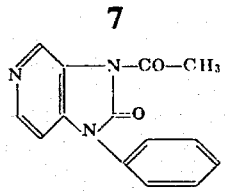

melting at 201°–204°.

Example 4

The mixture of 1.05 g of 1-phenyl-2-oxo-3H-1,2-dihydroimidazo[4,5-c]pyridine, 0.61 g of pivaloyl chloride and 50 ml of pyridine is refluxed for 18 hours and evaporated. The residue is washed with water and recrystallized from acetonitrile, to yield the 1-phenyl-2-oxo-3-pivaloyl-1,2-dihydro-imidazo[4,5-c]pyridine of the formula

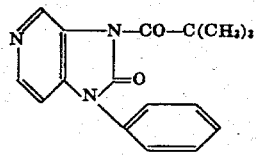

melting at 160°–162°.

Analogously to the above method, there is obtained the 1-phenyl-2-oxo-3-(4-chloro)-benzoyl-1,2-dihydro-imidazo[4,5-c]-pyridine, melting at 210° C, from the corresponding 1-phenyl-2-oxo-3H-2-dihydro-imidazo[4,5-c]pyridine and 4-chloro-benzoyl chloride.

Example 5

The mixture of 0.63 g of 1-phenyl-2-oxo-3H-1,2-dihydroimidazo[4,5-c]pyridine, 0.45 g of 4-chlorophenylisocyanate and 100 ml of benzene is refluxed for 18 hours and evaporated. The residue is recrystallized from benzene, to yield the 1-phenyl-2-oxo-3-(4-chlorophenylcarbamoyl)-1,2-dihydro-imidazo[4,5-c]pyridine of the formula

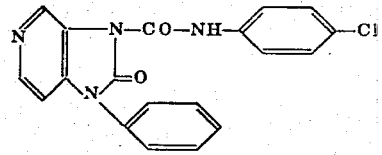

melting at 198°–201°.

Example 6

Analogous to the methods illustrated by the previous examples, the following compounds of Formula II are prepared from equivalent amounts of the corresponding starting materials: $R_1 = H$, $X = O$

| No. | $\eta$ | $R_2$ | m.p. °C | Recryst. from |
|---|---|---|---|---|
| 1 | 0 | 4-HO-phenyl | above 325 | A-B |
| 2 | 0 | 4-CH$_3$O-phenyl | 252 | A |
| 3 | 0 | 2-F-phenyl | 236.5 | A |
| 4 | 0 | 4-F-phenyl | 241 | A |
| 5 | 0 | 3-Cl-phenyl | 245 | A |
| 6 | 0 | 4-Cl-phenyl | 256 | A-B |
| 7 | 0 | 3-CF$_3$-phenyl | 252 | A-C |
| 8 | 0 | 4-CF$_3$-phenyl | 205 | D |
| 9 | 0 | 3,4,5-(CH$_3$O)$_3$-phenyl | 230 | E |
| 10 | 0 | 4-Br-phenyl | 260 | E |
| 11 | 1 | 4-Cl-phenyl | 222 | A |
| 12 | 2 | phenyl | 145 | D |

$A$ = methanol, $B$ = dimethylformamide, $C$ = methylene chloride, $D$ = benzene, $E$ = ethanol

Example 7

To a solution of 0.75 g of potassium ethyl xanthate in 15 ml of water is added 1.0 g of 3-amino-4-(4-chloro)-phenylaminopyridine. The resulting mixture is stirred and heated to reflux for 3 hours. On cooling, the pH of the mixture is adjusted between 5 and 6 with 50 percent aqueous acetic acid. The solids formed are collected on a filter, washed with water and dried. Recrystallization of the solids from ethanol affords the 1-(4-fluoro)-phenyl-2-mercapto-imidazo[4,5-c]-pyridine of the formula

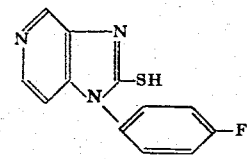

melting at 315°–316° C.

Example 8

Preparation of 10,000 tablets each containing 25.0 mg of the active ingredient:

| Formula: | |
|---|---|
| 1-(4-chlorophenyl)-2-oxo-3H-1,2-dihydro-imidazo [4,5-c]pyridine | 250.00 g |
| Lactose | 1,956.00 g |
| Corn starch | 90.00 g |
| Polyethylene glycol 6,000 | 90.00 g |
| Talcum powder | 90.00 g |
| Magnesium stearate | 24.00 g |
| Purified water | q.s |

Procedure:

All the powders are passed through a screen with openings of 0.6 mm. Then the drug substance, lactose, talcum, magnesium stearate and half of the starch are mixed in a suitable mixer. The other half of the starch is suspended in 45 ml water and the suspension added to the boiling solution of the polyethylene glycol in 180 ml water. The paste formed is added to the powders which are granulated, if necessary, with an additional amount of water. The granulate is dried overnight at 35°, broken on a screen with 1.2 mm openings and compressed into tablets using concave punches with 7.1 mm diameter, uppers bisected.

We claim:

1. A 3H-1,2-dihydro-imidazo[4,5-c]pyridine corresponding to the formula

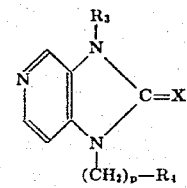

in which $R_3$ is hydrogen, alkyl, allyl or lower alkanoyl, X is oxygen, p is an integer from 0 to 2 and $R_4$ is phenyl, (alkyl)-phenyl, (hydroxy)-phenyl, lower (alkoxy)-phenyl, (halogeno)-phenyl or (trifluoromethyl)-phenyl, wherein alkyl contains up to 4 carbon atoms or therapeutically acceptable acid addition salts thereof.

2. A compound as claimed in claim 1, in which formula $R_3$ is hydrogen, methyl, acetyl or pivaloyl, X is oxygen, p is the integer 0 and $R_4$ is phenyl, 4-fluorophenyl or 4-chlorophenyl, or therapeutically acceptable acid addition salts thereof.

3. A compound as claimed in claim 1, and being the 1-(4-chlorophenyl)-2-oxo-3H-1,2-dihydro-imidazo[4,5-c]pyridine, or a therapeutically acceptable acid addition salt thereof.

* * * * *